US006734911B1

(12) United States Patent
Lyons

(10) Patent No.: US 6,734,911 B1
(45) Date of Patent: May 11, 2004

(54) TRACKING CAMERA USING A LENS THAT GENERATES BOTH WIDE-ANGLE AND NARROW-ANGLE VIEWS

(75) Inventor: Damian M. Lyons, Putnam Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/408,787

(22) Filed: Sep. 30, 1999

(51) Int. Cl.[7] .................. G02B 13/16; H04N 5/225; H04N 9/07
(52) U.S. Cl. .................. 348/340; 348/335; 348/169
(58) Field of Search .................. 359/725, 708, 359/749, 750, 751, 752, 753; 348/335, 340, 342, 169, 170, 171, 172, 360; 382/103; 396/71, 73, 74, 75, 95, 359, 348, 382

(56) References Cited

U.S. PATENT DOCUMENTS

| | | | | |
|---|---|---|---|---|
| 4,322,124 A | * | 3/1982 | Padgitt et al. | 250/353 |
| 4,554,585 A | * | 11/1985 | Carlson | 348/342 |
| 5,005,083 A | * | 4/1991 | Grage et al. | 348/588 |
| 5,051,830 A | * | 9/1991 | von Hoessle | 348/335 |
| 5,172,235 A | * | 12/1992 | Wilm et al. | 348/343 |
| 5,251,073 A | * | 10/1993 | Schauss | 359/715 |
| 5,489,940 A | * | 2/1996 | Richardson et al. | 348/315 |
| 5,563,650 A | | 10/1996 | Poelstra | 348/36 |
| 5,734,511 A | * | 3/1998 | Braat | 359/716 |
| 6,002,525 A | * | 12/1999 | Poulo et al. | 359/642 |
| 6,201,574 B1 | * | 3/2001 | Martin | 348/315 |
| 6,449,103 B1 | * | 9/2002 | Charles | 359/725 |
| 6,507,366 B1 | * | 1/2003 | Lee | 348/352 |
| 6,542,184 B1 | * | 4/2003 | Driscoll et al. | 348/211.3 |

FOREIGN PATENT DOCUMENTS

| | | | | |
|---|---|---|---|---|
| CA | 2147333 | 10/1996 | ........... | G02B/13/06 |
| EP | 0 610 863 A1 | 2/1994 | | |
| JP | 99139878 A | 5/1997 | ........... | H04N/5/232 |

OTHER PUBLICATIONS

Masaki Fujimaki, "Multifocus Optical System", Appl. No. 3–194502, Dec. 1989, Abstarct.

* cited by examiner

Primary Examiner—Wendy R. Garber
Assistant Examiner—Justin Misleh

(57) ABSTRACT

A tracking system that provides high resolution images and a low tracking dropout rate is disclosed. The system uses a camera equipped with a dual-angle lens (or another dual-angle focusing system) to obtain both a wide-angle image and a narrow-angle image of a scene. The narrow-angle image provides a high resolution view of the scene. If the object being tracked moves out of the field of view of the narrow-angle image, the wide-angle image is used to find the object. The aim of the camera is then adjusted so that the object will once again appear in the narrow-angle image.

17 Claims, 14 Drawing Sheets

TRACKING CAMERA USING A LENS THAT GENERATES BOTH WIDE-ANGLE AND NARROW-ANGLE VIEWS

BACKGROUND OF THE INVENTION

The present invention relates to tracking cameras that use a dual-view optical system to permit the generation of a first image with a narrow-angle field of view and a second image with a wide-angle field of view. The narrow-angle image is used to produce a high quality output image, and the wide-angle image is used to improve tracking performance of the tracking system. Both images may be maintained in continuous logical registration with respect to one another so that the tracking system can determine how the object in one image should appear in the other image.

A camera tracking system is one that automatically maintains a subject in view of the camera. This can be accomplished by acquiring a target and maintaining the target in the central view area of the tracking camera. Various kinds of tracking systems are known. Maintenance of the target in the view of the camera by the tracking system can be accomplished based on the definition of the tracked object using some kind of artificial intelligence mechanism, manually, through voice commands, or by a combination of these.

Conventional tracking systems typically track moving objects using a camera with an image detector to capture images of the object. These captured images are then processed to find and track the object. When a camera with a relatively narrow field of view is used to capture the images, and the object being tracked (OBT) moves far away from the center of the camera's field of view, the camera's aim must be adjusted to continue the tracking process. For example, if the OBT moves to the right, the camera's aim would be adjusted to the right.

With conventional tracking systems, it is best to adjust the camera's aim before the OBT moves completely out of the camera's field of view, because once the image of the OBT is lost, the object must be reacquired. With fast-moving objects, however, it can be difficult for the tracking system to adjust the camera's aim before the OBT "falls off" the edge of the image. This condition where the OBT falls off the edge of the image is referred to herein as a "tracking dropout".

When a tracking dropout occurs in a conventional tracking system, the system can attempt to reacquire the OBT by panning and tilting the camera along a predetermined search pattern. But reacquiring the OBT can be difficult or impossible, particularly in cases where the OBT continues to move about rapidly. In the meantime, until the OBT is reacquired, the tracking system remains unaware of the OBT's location. While tracking dropouts may be acceptable in certain applications, they are not acceptable in other applications such as security systems and camera systems that track balls at sporting events.

Using wide-angle focusing optics for tracking can help avoid tracking dropouts, because the wider field of view provided by such optics gives the tracking system additional time to adjust the camera's aim before the OBT leaves the camera's field of view. In fact, if a maximum speed for all possible OBTs is known in advance, tracking dropouts can be completely eliminated by using optics with a sufficiently wide field of view.

Unfortunately, using wide-angle lenses to avoid tracking dropouts has two undesirable side effects. First, the resolution of images obtained using even moderately wide wide-angle optics is lower than the resolution of images obtained using narrow-angle lenses. This reduced resolution may result in images that are not suitably sharp for certain applications. For example in security systems, the operator may require a clear, undistorted image of the target at all times.

A second undesirable side effect of wide-angle optics is the distortion that occurs near the top, bottom, and sides of images obtained using wide-angle lenses. This distortion increases as the field of view of the lens gets wider, and is particularly pronounced with fisheye optics.

One prior art system that provides the superior tracking performance of wide-angle optics without sacrificing image quality uses two cameras: a fixed-position, wide-angle, lower-solution camera; and an aimable, narrow-angle camera. In this system, the OBT's position can always be located using the image data obtained from the wide-angle camera, no matter where or how fast the OBT moves. A tracking system then uses the position information obtained from the wide-angle image to aim the narrow-angle camera at the OBT. A high resolution image of the OBT can be then be acquired using the narrow-angle camera.

With this two-camera prior art arrangement, tracking dropouts can be eliminated or minimized, because even if the OBT moves out of the field of view of the narrow-angle lens, the OBT can be reacquired using the image information captured by the wide-angle image camera. Unfortunately, this two-camera approach is relatively expensive and bulky, because it uses two independent cameras.

A number of systems have been described in the prior art for producing wide angle views as well as narrow angle views. These systems are designed for special effects or for producing multiple image-types, but not in connection with video tracking. For example, one system produces a panorama view and a direct view in the same system. The panorama view remains fixed and the direct view can be changed. A single camera captures both the panoramic view and the direct narrow-angle view on a single CCD image.

There are various other references describing a special-effects optical system. One is Patent Abstracts of Japan Publication No. 09139878A, which describes a lens with a first region having a first focal length designed to focus on a background subject, and a second region having a second focal length designed to focus on a foreground subject. Similarly, Patent Abstracts of Japan Publication No. 3-194502 (A), describes using a first lens with a first focal length and a second lens with a second focal length to simultaneously form a normal and a magnified-view of a single object. Also, Canadian Patent Application 2,147,333 discusses an optical system that includes a fisheye lens that produces a wide-angle image of everything in front of the optical system, and combines it with an image of objects that are behind the camera. The above optical systems are designed for special effects and, in general, are unrelated to video tracking.

A system that employs the advantages of a wide angle view for tracking purposes and the excellent image quality obtainable with narrow angle optics is desirable. Although various optical systems exist for generating multiple views on the same image device, none relates to the field of video tracking or discusses this problem. In the field of video tracking, no good solutions to the conflicting problems of tracking the subject and forming a high quality image in a video tracking system are described.

SUMMARY OF THE INVENTION

The present invention relates to a tracking system that provides high quality images and a low tracking dropout rate. The system uses a camera equipped with dual-angle optics to obtain both a wide-angle image and a narrow-angle image of a scene. The narrow-angle image provides a high resolution view of the scene, and the wide-angle image is used for finding and following the OBT. If the OBT moves out of the high resolution area, information obtained using the wide-angle, lower resolution image is used to find the OBT. The aim of the camera is then adjusted so that the OBT will once again appear in the narrow-angle image.

One aspect of the invention relates to a camera that includes an image sensor and a set of optics. When the camera is aimed at a point of a scene, the optics form a narrow-angle image of the point and a central area surrounding the point on a central region of the image sensor, and form a wide angle image of an area surrounding the central area on a peripheral region of the image sensor.

Another aspect of the invention relates to an apparatus for optically tracking a subject. The apparatus includes a camera, optics, a movable base, and a tracking system. The camera has an image sensor with a first region and a second region, and an output. A central portion of the optics produces a narrow-angle view, and a peripheral portion of the optics produces a wide-angle view. When the camera is aimed at a point, the central portion of the optics forms an image of the point and a central area surrounding that point on the first region of the image sensor, and the peripheral portion of the optics forms an image of an area surrounding the central area on the second region of the image sensor. The camera is mounted on the movable base, which is configured to aim the camera in response to drive signals applied to at least one input. The tracking system generates these drive signals based on the output of the image sensor. When a desired subject is imaged by the second region of the image sensor, the drive signals generated by the tracking system cause the movable base to aim the camera at the desired subject.

Another aspect of the invention relates to an apparatus for optically tracking a subject. The apparatus includes an image sensor, an optical system, a movable base, and a tracking system. The image sensor has a first region, a second region, and an output. The optical system, which could include, for example, lenses and/or mirrors, has a first portion with a narrow-angle view and a second portion with a wide-angle view. When the optical system is aimed at a subject, the first portion of the optical system forms an image of the subject on the first region of the image sensor, and the second portion of the optical system forms an image on the second region of the image sensor. The optical system is mounted on the movable base, which aims the optical system in response to drive signals. Based on the output of the image sensor, the tracking system generates these drive signals. When the subject is imaged by the second region of the image sensor, the drive signals generated by the tracking system cause the base to aim the optical system at the subject.

Another aspect of the invention relates to a method of tracking an object in a scene using an aimable wide-angle imaging system and an aimable narrow-angle imaging system. The method operates by obtaining a wide-angle image of the scene using the wide angle imaging system and finding a position of the object in the scene based on this wide-angle image. Then, both the narrow-angle imaging system and the wide-angle imaging system are aimed at the found position.

Another aspect of the invention relates to an apparatus for optically tracking a subject. The apparatus includes a camera with a pan, tilt, and zoom (PTZ) base, and a tracking system. The camera has an output and a zoom lens with a narrow-angle setting and a wide-angle setting, one of which is selected in response to a zoom signal. The switchover between zoom and narrow-angle settings must be as rapid as possible to insure against loss of the OBT. The camera is aimed in response to aiming signals. Based on the camera output, the tracking system tracks a subject when the zoom lens is set to the narrow-angle view. If the tracking system loses track of the subject, the tracking system generates a zoom signal that sets the zoom lens to the wide-angle view and locates the position of the subject based on the camera output. Then, the tracking system generates an aiming signal that aims the camera at the located position of the subject, and generates a zoom signal that returns the zoom lens to the narrow-angle view.

Another aspect of the invention relates to a camera. The camera includes a planar image sensor with an image plane, at least one first lens, and at least one second lens. The first lens(es) has (have) a first optical axis and a first focal length, and the at least one second lens has a second optical axis and a second focal length. The second focal length is longer than the first focal length, and the first and second optical axes are substantially collinear. The first and second lenses are positioned to form respective images on the image sensor.

DETAILED DESCRIPTION OF THE EMBODIMENTS

Figure 1A:
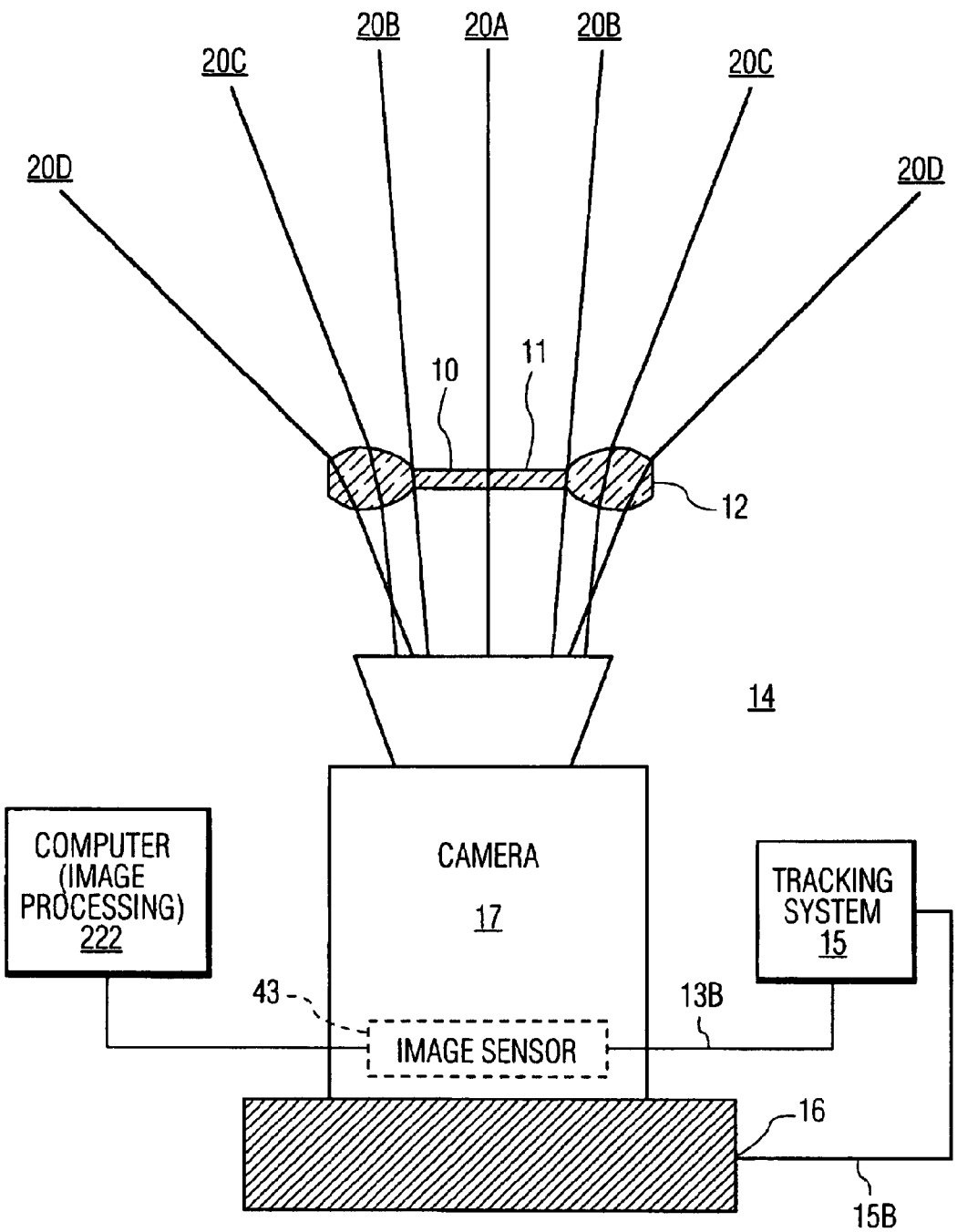
FIG. 1A is a schematic diagram of a combination wide-angle and narrow-angle tracking system, with the optical system shown in section view.
Figure 1B:
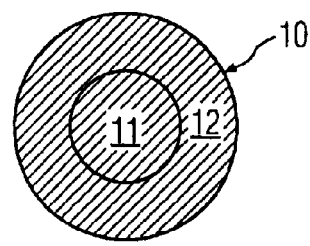
FIG. 1B is an axial section of the of the combination lens element of FIG. 1A.

Referring to FIGS. 1A and 1B, a combined lens element 10 distorts the visual field viewed by a camera 17 to produce coaxial wide angle and narrow angle views of a scene. Light rays 20A–20D reflected from the scene are refracted by the lens element 10. The lens element 10 has a first portion 11 that, in combination with optics in the camera, produces a narrow angle view of the scene with a field of view $\Theta_N$. The lens element 10 has a second portion 12, coaxial with the first, that, in combination with optics in the camera, produces a wide angle view of the scene with a field of view $\Theta_W$. In the illustrated embodiment, the first portion 11 is a weak lens or flat plate, and the second portion 12 is a toroidal element.

Figure 1C:
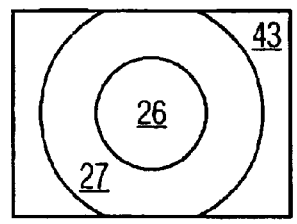
FIG. 1C illustrates the image regions produced by the camera of FIG. 1A.

Referring now also to FIG. 1C, the field of view within the cone of rays 20B is refracted by the narrow-angle portion 11 of the lens 10 and is imaged normally by the camera 17. The focusing optics in the camera 17 focuses this light onto a central region 26 of an image sensor 43 (illustrated in FIG. 1C). The annular field of view between the cones of rays 20D and 20B is refracted by the wide-angle portion 12 of the lens element 10. The focusing optics in the camera 17 focuses this light onto an annular or peripheral region 27 on the image sensor 43.

The camera 17 may be configured as required according to techniques well known to those skilled in the art. It is understood that the second portion 12, for example, does not produce an image conventionally since it has different focal lengths in the radial and tangential planes. Thus, to form an image with such a device, other optics and or image processing devices may be used. Note also that the distortion introduced by the second portion includes inverting the image as discussed further on. Focussing of the camera 17 may be implemented in any conventional manner, and may be configured to always favor the image formed on either the central region 26 or the peripheral region 27. Alternatively, the focus of the camera 17 may be adjusted to selectively favor one of the regions 26, 27, depending on whether or not the OBT is currently being imaged in the central region 26.

Also note that some error in the image may be tolerated since the purpose of the wide-angle view is to search for a lost object, not produce a perfect image. In practical applications, the design may be fairly complex due to chromatic aberration issues, non-focussed image portions, etc. The problems with focus and aberration may be handled with multiple lens elements or mathematically from the sensor data by a computer using spatial deconvolution using an image processing computer 222 in any conventional manner. The sensor 43 may include a charge-coupled device (CCD) image sensor, an active pixel CMOS image sensor, and/or any other applicable imaging technology.

Note also that the image for the annular region may be favored, for optical focussing purposes, so that a computational correction may be applied by the image processing computer 222 for only the central region 26. Again, the camera may not be capable of producing a perfect image because of the properties of the toroidal second portion 12, but this distortion can either be tolerated or ameliorated by computations means.

Alternative embodiments will be apparent to persons skilled in the art, including, for example, embodiments that use Fresnel lenses in place of the ordinary lenses shown, and embodiments that use a concave lens to obtain the wide-angle view. Note that the second portion can have a variety of different shapes and still perform the function of "gathering" the wide field of view into a narrower region that is viewable by the camera.

Figure 1D:
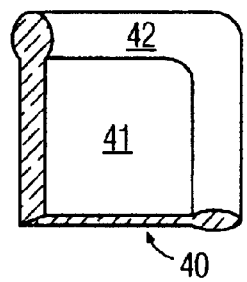
FIG. 1D is an illustration of an alternative combination lens element.
Figure 1E:
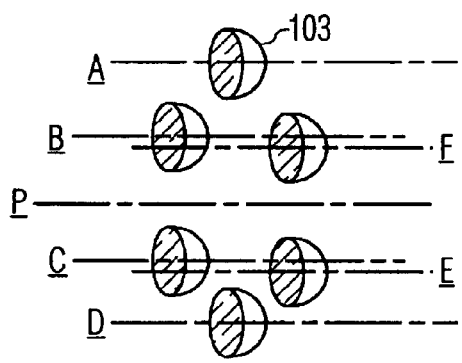
FIG. 1E is a section view of a variation of the lens element of FIG. 1D.
Figure 1F:
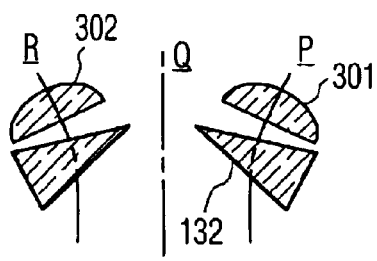
FIG. 1F is an illustration of an alternative wide angle lens element configuration.

Referring now to FIG. 1D another lens element 40 that includes both a wide-angle section 42 and a narrow-angle section 41 may be used with the embodiment of FIG. 1A. In this embodiment, a narrow-angle section 41 is a planar portion or a weak lens. This portion corresponds to the first portion 11 if the FIG. 1A embodiment. A wide-angle section 42, with an optical axis substantially collinear to the optical axis of the narrow angle section 41, produces a wide angle view of the scene cooperatively with optics in the camera. The latter portion corresponds to the second portion 12 of the FIG. 1A embodiment. When this type of combination lens 40 is used, the resulting image that is formed on the image sensor 43 will have a large narrow-angle section corresponding to the narrow-angle section 41 of the lens 40, and a rectangular wide-angle section corresponding to the wide-angle section 42 of the lens 40. Referring to FIG. 1E, another alternative for the lens element 10 of FIG. 1A is a polar array of wide angle lenses 103. These would produce multiple images on the image sensor 43, each corresponding to a respective wide angle field of view with respective axes A–F. In the latter alternative embodiment, the wide-angle fields would be substantially overlapping. An improvement on this design is shown in FIG. 1F in which the optical axis (two are shown) P and R of each wide angle lens element 301 and 302, has a component that is parallel to the optical axis Q of the camera 17 and a component of that is radial. The axes P and R (and as many others in the polar array) could be bent using a respective prism 132 for each lens element 301 and 302. In such a configuration, the fields of view could be substantially non-overlapping. Alternatively, other shapes for the wide-angle section may be used in place of the toroidal shape of FIG 1A as will be appreciated by persons skilled in the art. The foregoing are illustrative embodiments and do not account explicitly for design details for an actual implementation that would be known to those skilled in the art. Thus, where single elements are depicted, it would be clear, depending on the particular design goals, that multiple elements would be required, for example to provide an extremely wide angle view such as a solid angle of 180°.

Figure 2A:
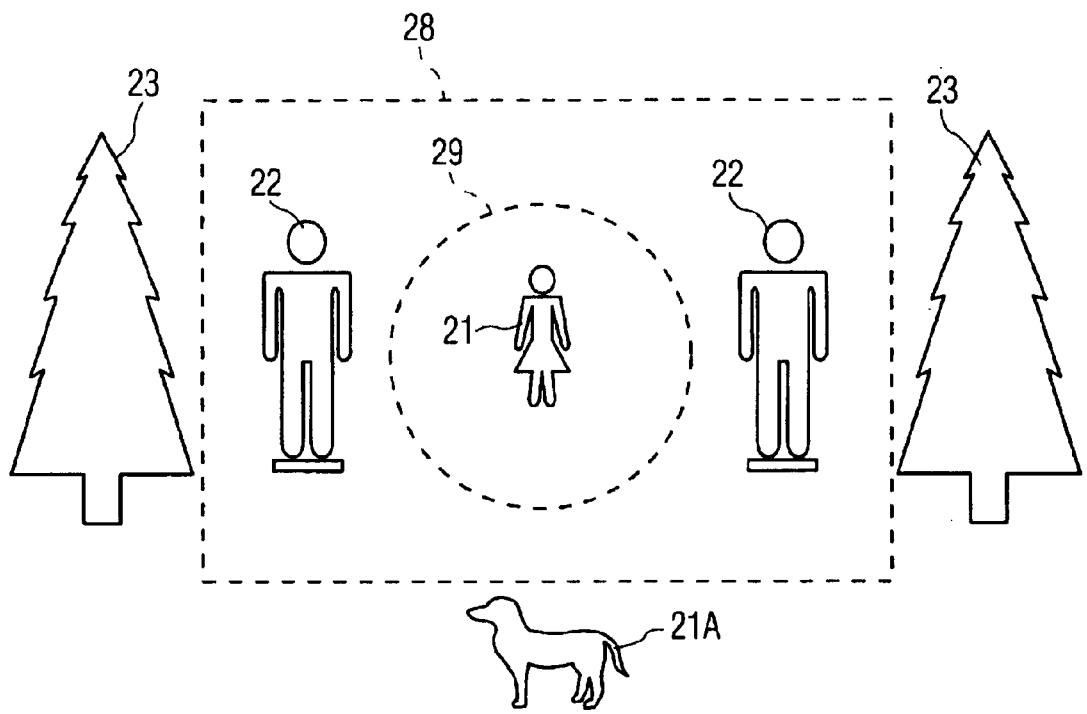
FIG. 2A illustrates scene viewed by the camera of FIG. 1A.
Figure 2B:
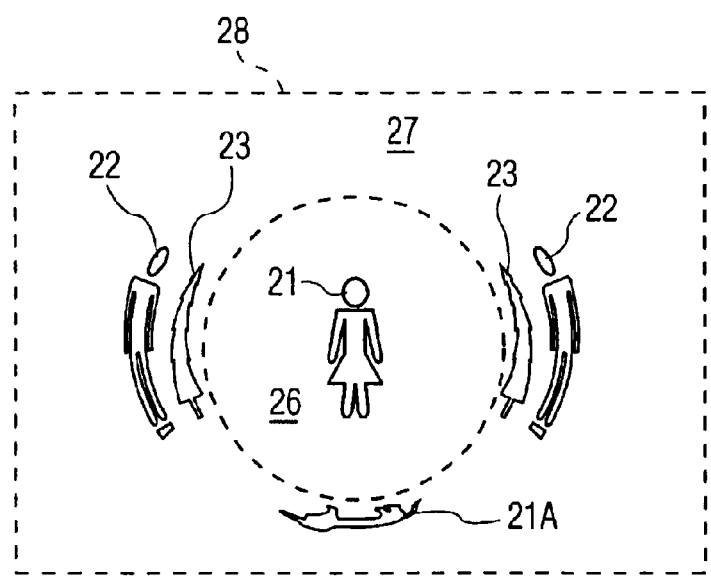
FIG. 2B illustrates the image produced by the embodiment of FIG. 1A.

Referring to FIG. 2A an example scene that includes the figure of a girl 21 at the center, a pair of men 22 on either side of the girl 21, a pair of trees 23 located on either side of the men 22, and a dog 21A in the foreground. If the scene of FIG. 2A is imaged onto a rectangular image sensor 43 having a size corresponding to the dotted line 28, only the portion of the scene bounded by rectangle 28 would be imaged onto the image sensor 43. While additional scene information from outside the dotted line 28 could also be imaged by using a wide angle lens, the resulting image on the image sensor 43 would have lower resolution and increased distortion. Referring now also to FIG. 2B, the device illustrated in FIG. 1A, images a central portion of the scene (inside the dotted line 29, shown in FIG. 2A) onto a central region 26 of the image sensor 43 with full resolution, and a peripheral portion of the scene (outside the dotted line 29) onto a peripheral region 27 of the image sensor 43 with lower resolution, as illustrated in FIG. 2B.

The output signals 13B from the image sensor 43 that correspond to the central region 26 of the image sensor 43 are used to generate output image, signals (e.g., VGA compatible output signals and composite analog video output signals) using any of a variety of techniques well known to those skilled in the art. These output image signals can then be used in any manner including, for example, inputting them to a conventional video monitor.

The output signals 13B from the image sensor 43 corresponding to the peripheral region 27 of the image sensor 43 may be ignored by the output image forming algorithms, which would result in a small non-distorted image bounded-by the dotted line 29. Alternatively, output signals 13B generated by the image sensor 13 corresponding to the peripheral region 27 may be provided to the output image forming algorithms, which would result in a larger output image with a non-distorted central region and a distorted outer region, as shown in FIG. 2B. As yet another alternative, the output signals 13B. generated by the image sensor 43 corresponding to the peripheral region 27 may be processed so as to correct for the distortion introduced by the wide-angle portion 12 of the lens 10. This processing would result in a larger output image with a non-distorted high resolution central region surrounded by a low resolution outer region. The resulting image would then be similar to the original scene shown in FIG. 2A, except that the region outside of the dotted line 29 would have a lower resolution.

Still referring to FIGS. 2A and 2B, note that the second portion 12 of the lens element 10 produces an image on the sensor 43 that is radially inverted. That is, objects that are closer to the center in the original scene appear to be further from the center in the image. Thus, the trees 23 and the men 22 switch places and the dog 21A flips upside down. Also, the objects (and the spaces between) are gathered together in the radial direction by the lens element 10, causing them to curve around the center.

Referring also to FIG. 1A, output signals 13B corresponding to the peripheral region 27 of the image sensor 43 are provided to the tracking system 15. Based on these output signals 13B, the tracking system 15 determines when the image of the OBT has moved to a position where the OBT is not being imaged by the central region 26 of the image sensor 43. The tracking system 15 then generates drive signals 15B, which are applied to the PT base 16 upon which the camera 14 is mounted, to re-aim the camera 14 so as to move the image of the OBT back onto the central region 26 of the image sensor 43.

Preferably, the drive signals 15B effect re-aiming by driving motors in the pan and tilt base (PT base) 16 so as to adjust the aim of the camera 14 in the desired direction. The details of control technology, image processing technology, mapping of field distortions, etc. required for tracking of an image are well known in the art and are not discussed in detail herein. The drive signals 15B from the tracking system 15 are configured to drive a conventional PT base. Examples of conventional PT bases include PTZ bases (pan, tilt, and zoom bases), boom mechanisms, or ther device capable of aiming, focusing, and changing the magnification.

Optionally, tracking performance may be improved by providing the tracking system with output signals 13B corresponding to both the peripheral region 27 and the central region 26 of the image sensor 43. With this arrangement, the tracking system can compensate for smaller movements of the OBT (e.g., when, the OBT moves away from the center of the central region 26 without moving entirely out of the central region 26). This arrangement may result in a smoother tracking motion, as compared to tracking systems that rely only on the output signals 13B corresponding to the peripheral region 27 of the image sensor 43.

Figure 3A:
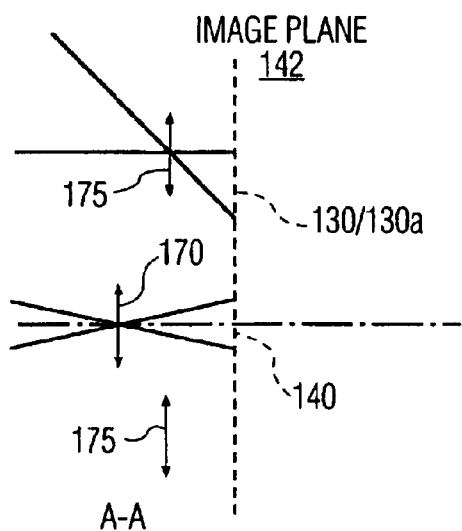
FIG. 3A is a radial partial section semi schematic of an alternative embodiment that uses a circular array of wide angle optical components to form a wide-angle search field.
Figure 3B:
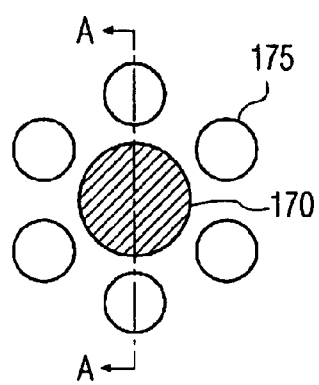
FIG. 3B is an axial partial section of the embodiment of FIG. 3A.
Figure 3C:
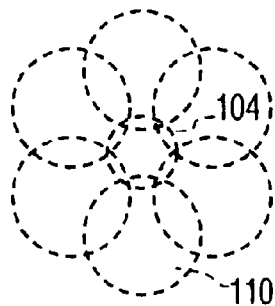
FIG. 3C is a planar development of the field of view of the camera of FIG. 1A with the alternative embodiment of FIGS. 3A–3B.
Figure 3D:
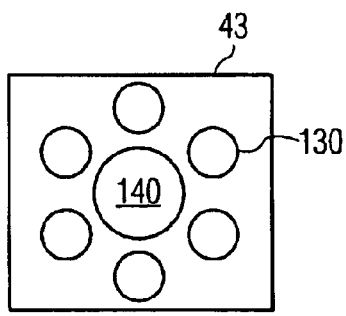
FIG. 3D shows the image regions on the image sensor associated with the embodiment of FIGS. 3A–3B.

Referring to FIGS. 3A–3D, an alternative embodiment of a combined camera and combination optics system produces a narrow field image 140 at an image plane 142 and an array of wide angle images 130 in a pattern around the narrow field image 140. This embodiment may be implemented without relying on imaging optics in a camera, because the optics in this embodiment produce real images. Focusing optics 175 (which is illustrated schematically, and may actually consist of one or more elements) produces an image 130 with a wide angle field of view 110 as shown. Focusing optics 170 (also illustrated schematically) produces an image 140 with a narrow angle field of view 104 as shown. Note that FIG. 3A is a section view of the partial section shown in FIG. 3B. FIG. 3C illustrates the respective fields of view as a planar development.

Figure 4A:
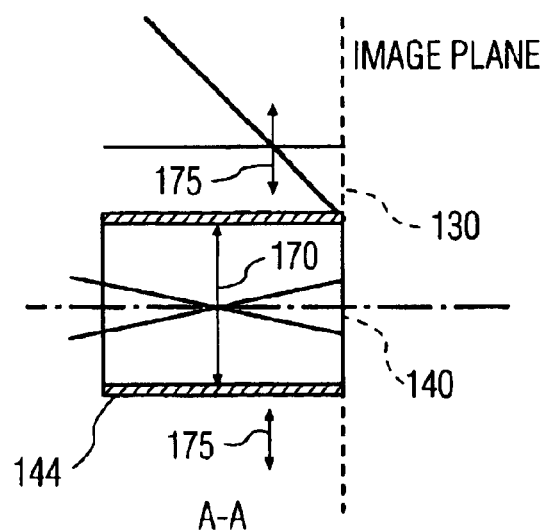
FIG. 4A is an embodiment similar to that of FIG. 3A with a mask added to prevent the wide-angle images from overlapping the narrow-angle image on the image sensor.
Figure 4B:
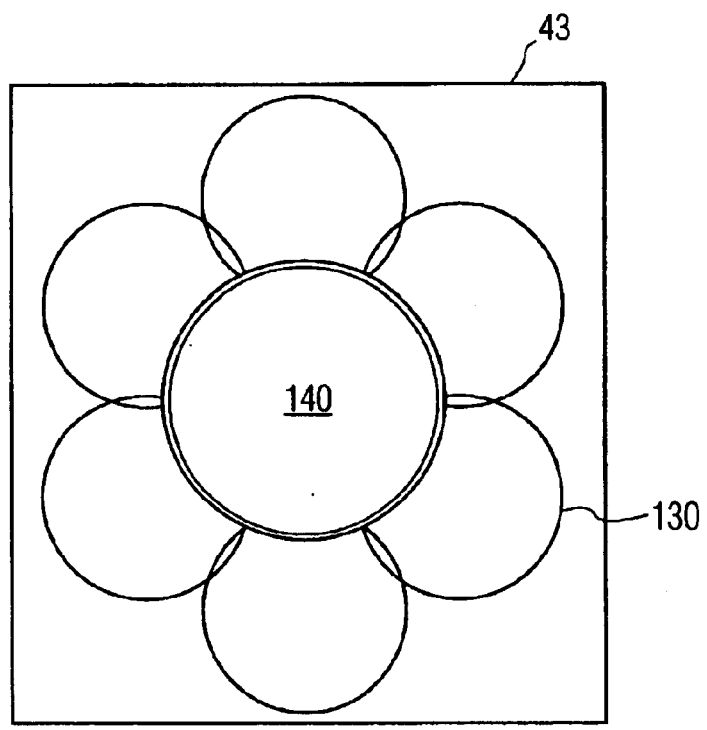
FIG. 4B illustrates the image produced by the FIG. 4A embodiment on the image sensor.

Referring now to FIGS. 4A and 4B, which is a variation of the embodiment of FIGS. 3A–3D, but with a mask 144 added to prevent the image areas 130 corresponding to the wide angle views 110 (shown in FIG. 3C) from overlapping the image area 140 corresponding to the narrow angle view 104 (shown in FIG. 3C). As shown in FIG. 4B, the use of the mask permits a larger fraction of the image sensor 43 to be used since the mask 144 permits the image areas 130 corresponding to the wide angle views 110 to be larger in areas.

Figure 5A:
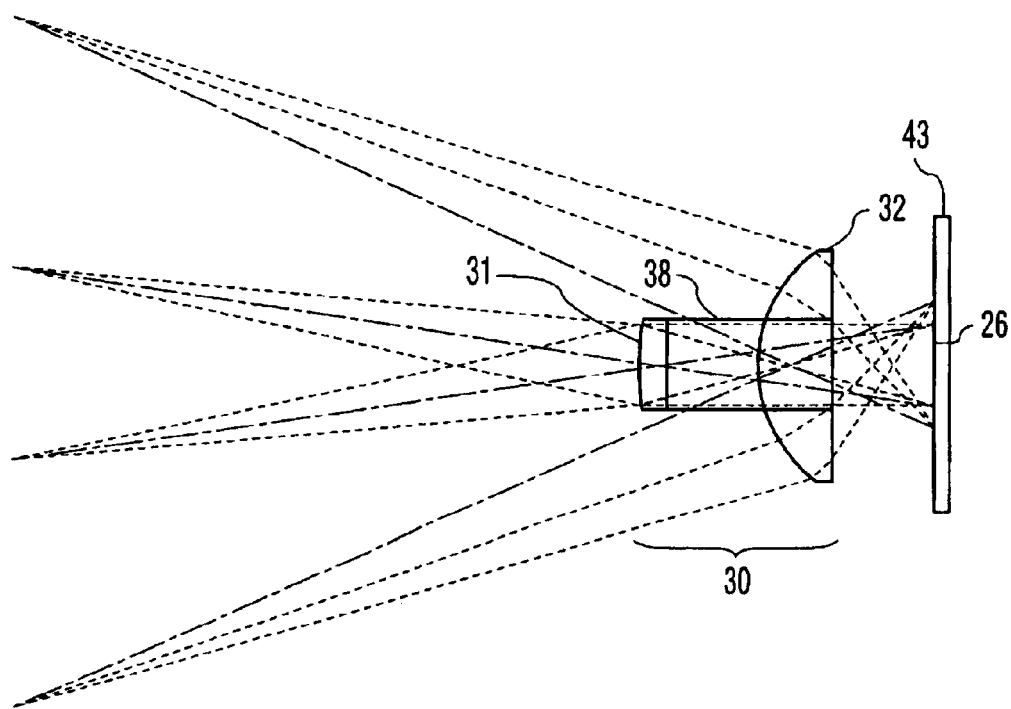
FIG. 5A is a schematic diagram of another embodiment of an optical system shown in section view.
Figure 5B:
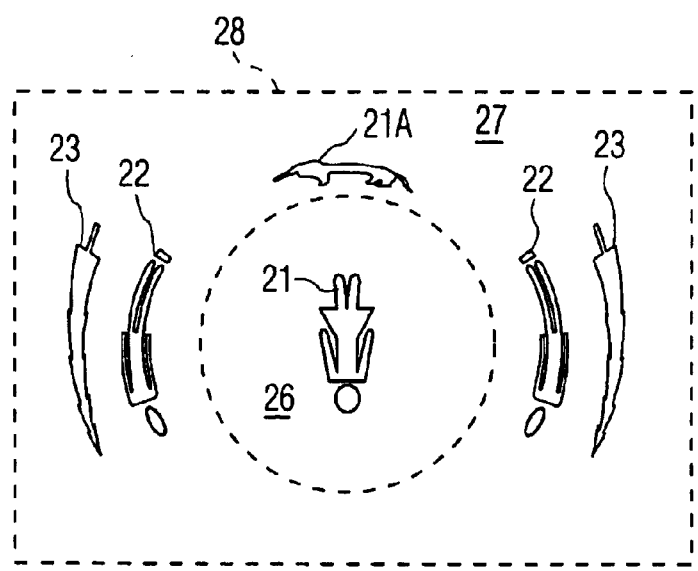
FIG. 5B shows the image regions on the image sensor associated with the embodiment of FIG. 5A.

Referring now to FIG. 5A, another embodiment that avoids the need for separate set of focusing optics (as in camera 17 of the FIG. 1A embodiment) uses coaxial wide angle 32 optics and narrow angle optics 31. These coaxial elements are capable of forming a single contiguous image on the image sensor 43 as illustrated in FIG. 5B. Element 31 is a convex lens that forms an image with a narrow-angle view onto a central region 26 (shown in FIG. 5B) of the image sensor 43. Element 32 is a toroidal convex lens which resembles an ordinary convex lens with a hole bored through the center. This toroidal lens element 32 focuses an image of a wide-angle scene onto a peripheral region 27 (shown in FIG. 5B) of the image sensor 43.

The illustration of FIG. 5B is similar to that of FIG. 2B except that in the FIGS. 5A/5B embodiment the wide angle images are not radially reversed. The two lens elements 31 and 32 are positioned at different distances from the image plane coinciding with the image sensor 43. This permits both to be in focus at the same time. To permit optical focusing, the system would require at least one of the elements to be moved relative to the other. Alternatively, one or both of the elements 31, 32 could be fixed-focus lenses or focusing correction could be performed by image processing. A mask 38 prevents light picked up from the narrow angle view from being imaged by the wide angle lens 32.

Figure 6A:
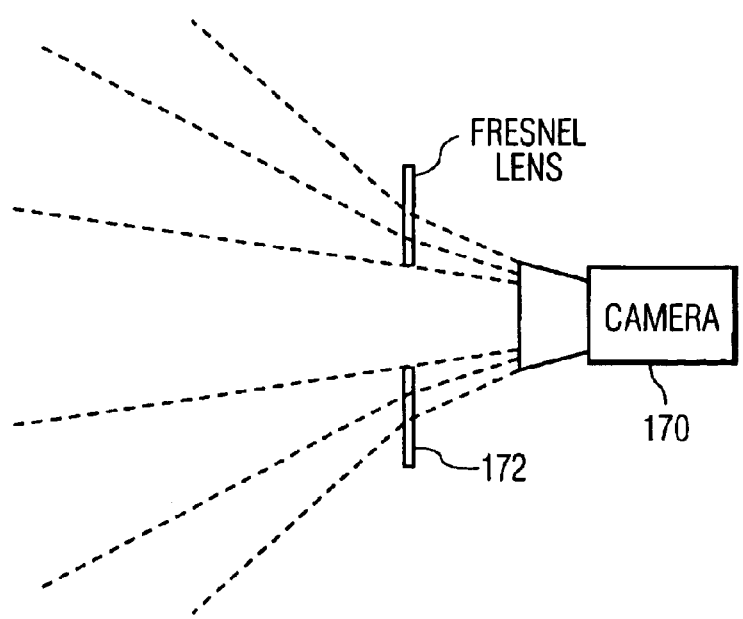
FIG. 6A is an embodiment that employs diverging optics based on Fresnel lenses and a camera to produce wide-angle and narrow-angle views for a camera.
Figure 6B:
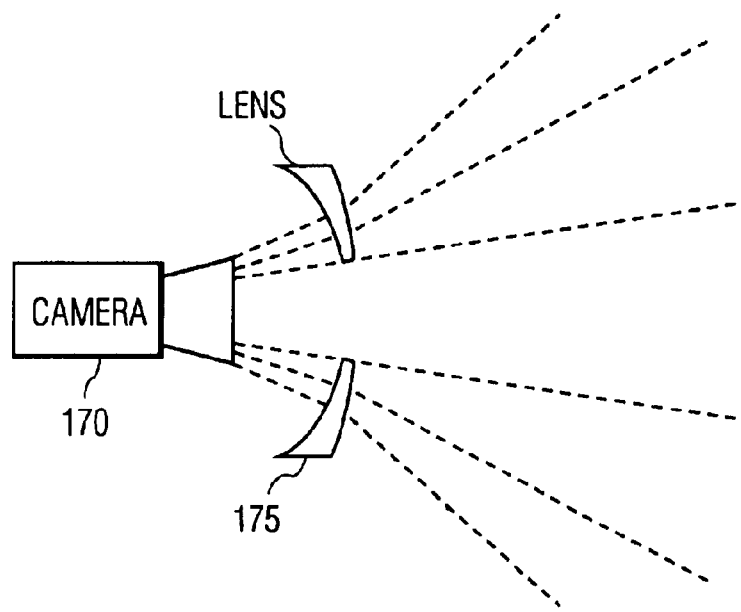
FIG. 6B is an embodiment that employs optics based on diverging conventional lenses and a camera to produce wide-angle and narrow-angle views for the camera.

Referring now to FIGS. 6A and 6B, another embodiment that employs diverging optics 172 or 175 in combination with a camera to create annular wide angle and narrow angle images as in the embodiment of FIGS. 5A and 5B. In the FIG. 6A embodiment, a Fresnel lens is used to radially gather (compress) the wide angle view into the medium angle view of the camera 170. As a result, the image created on the image sensor (not shown) of the camera 170 contains both wide and narrow angle views as illustrated in FIG. 5B. Note that the diverging optics 172 or 175 can change the effective focal length of the camera's own focusing optics (not shown) so that either the annular wide angle view or the central narrow angle view (or both) is in focus. As discussed above, imperfect focus can be corrected by image processing, additional optics, or simply tolerated. Again, if image processing is used, it is preferred that the focus of the central narrow angle image be sacrificed in favor of the annular wide angle image and the narrow angle image corrected numerically.

Figure 7A:
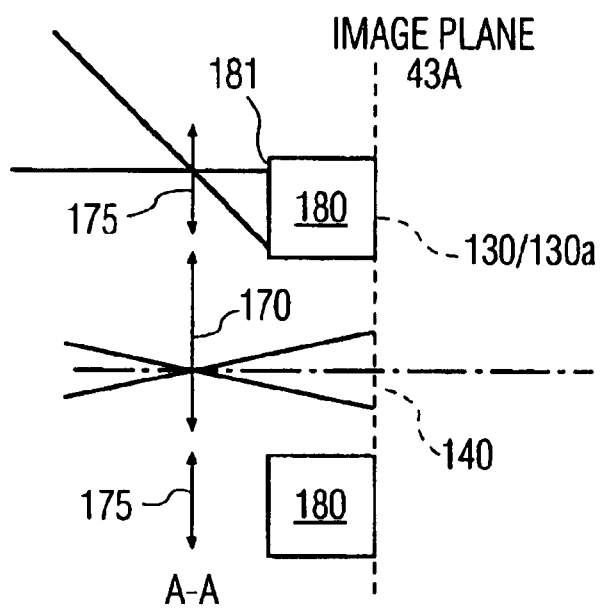
FIG. 7A is a radial section semi-schematic view of another embodiment that uses fiber optic bundles to map an image to the image sensor.
Figure 7B:
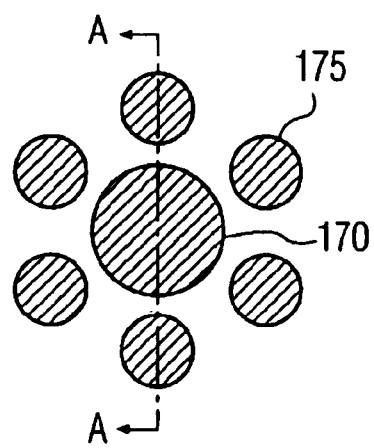
FIG. 7B is an axial section view of the FIG. 7A embodiment.

FIGS. 7A and 7B illustrate another embodiment similar to that of FIGS. 3A–3D except that the wide angle 175 and narrow angle 170 focussing optics are in the same plane. The wide angle image is formed on the surface 181 of a fiber optic bundle 180 that maps the image onto the surface of the image plane 43A of the image sensor 43. As in the embodiment of FIGS. 3A–3D, this embodiment does not require the auxiliary focussing optics of a camera. In another alternative, an individual image sensor may be provided for each portion of the lens. Numerous other alternative focussing arrangements will be apparent to persons skilled in the art.

Figure 8A:
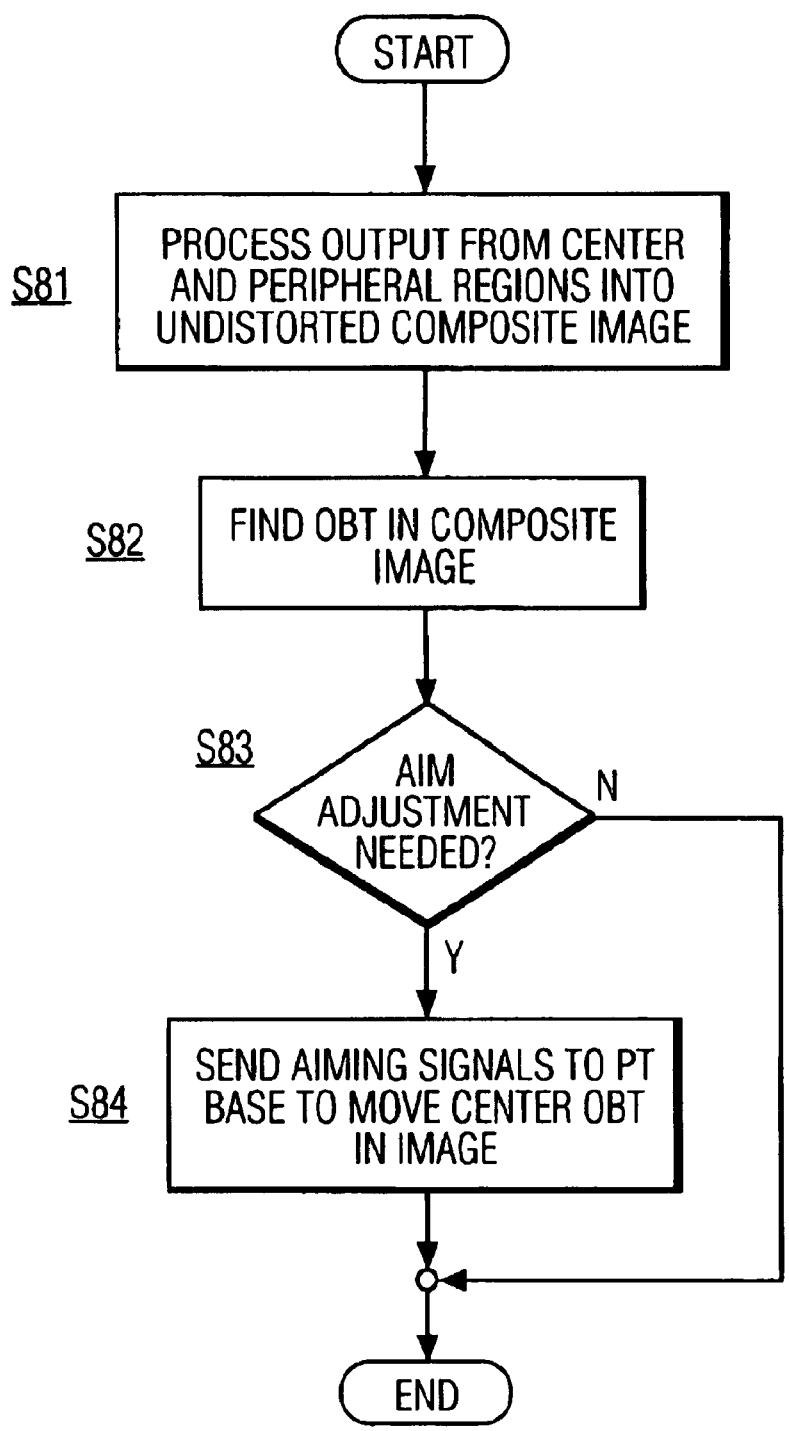
FIG. 8A is a flowchart of a first tracking process.

FIG. 8A is a flow chart of a first process implemented by the tracking system 15 to track the OBT. In this process, the tracking system 15 tracks the OBT using output signals 13B corresponding to both the central region 26 and the peripheral region 27 of the image sensor 43.

First, in step S81, the tracking system performs an inverse distortion algorithm on the data received from the peripheral region 27 of the image sensor 43. This inverse distortion algorithm may be implemented using any of a variety of techniques well known to those skilled in the art, including for example, the techniques described in European Patent Application Publication No. 0 610 863 A1, U.S. Pat. No. 5,563,650, and Canadian Patent No. 2,147,333, each of which are incorporated herein by reference. Preferably, the inverse distortion algorithm performs interpolation to fill in additional pixels, as required. The inverse distortion algorithm transforms the image captured by the peripheral region 27 of the image sensor 43 into an undistorted image with a blank region in the center. The image corresponding to the central region 26 of the image sensor 43 is then used to fill in this blank region, resulting in an undistorted composite image.

In step S82, the OBT is found in the composite image. Finding the OBT may be accomplished using any of a variety of techniques well known to those skilled in the art. Once the OBT has been found, a test is performed in step S83 to determine whether a camera-aim adjustment is need. A way to determine whether an aim adjustment is needed is to check whether the OBT was found more than a predetermined distance away from the center of the central region of the image. If no aim adjustment is needed, no further processing is performed in this routine. If, on the other hand, an aim adjustment is needed, processing proceeds to step S84 where the tracking system 15 sends drive signals 15B to the PT base 16 to aim the camera 14 so that the OBT will move towards the center of the composite image. For example, when an OBT has been found below and to the right of the center of the composite image, the tracking system 15 will generate drive signals 15B that will cause the PT base 16 to pan and tilt the camera 14 downwards. and to the right. After the aim of the camera 14 has been so adjusted in step S84, no further processing is performed in this routine.

In an alternative embodiment (not shown), the tracking system 15 tracks the OBT using the output from both the central region 26 and the peripheral region 27 of the image sensor 43 without applying an inverse distortion algorithm to the portion of the image data captured by the peripheral region 27. As a result, tracking is performed based on a composite image that is undistorted in the center and distorted at its periphery.

While elimination of the inverse distortion algorithm simplifies the image processing in this alternative embodiment, it can also complicate the process of finding the OBT in the composite image. This complication is the result of the change in appearance of the OBT, which occurs as the OBT moves further and further out into the peripheral region. But in cases where the OBT is the only thing in the image that moves, it will still be relatively easy to find the OBT, because all detected changes in pixel value will occur at or near the OBT. Similarly, in cases where the OBT has a unique color that does not appear in the rest of the scene being imaged, it will be relatively easy to find the OBT, because pixels with the unique color will always correspond to the OBT.

Once the OBT has been found in the composite image, aim adjustments are implemented in a manner similar to the FIG. 5 embodiment described above, except that the aim adjustments are preferably modified in a non-linear manner to compensate for the non-linearities in the relationship between the true location of the OBT and the apparent location of the OBT in the peripheral region of the distorted image.

Figure 8B:
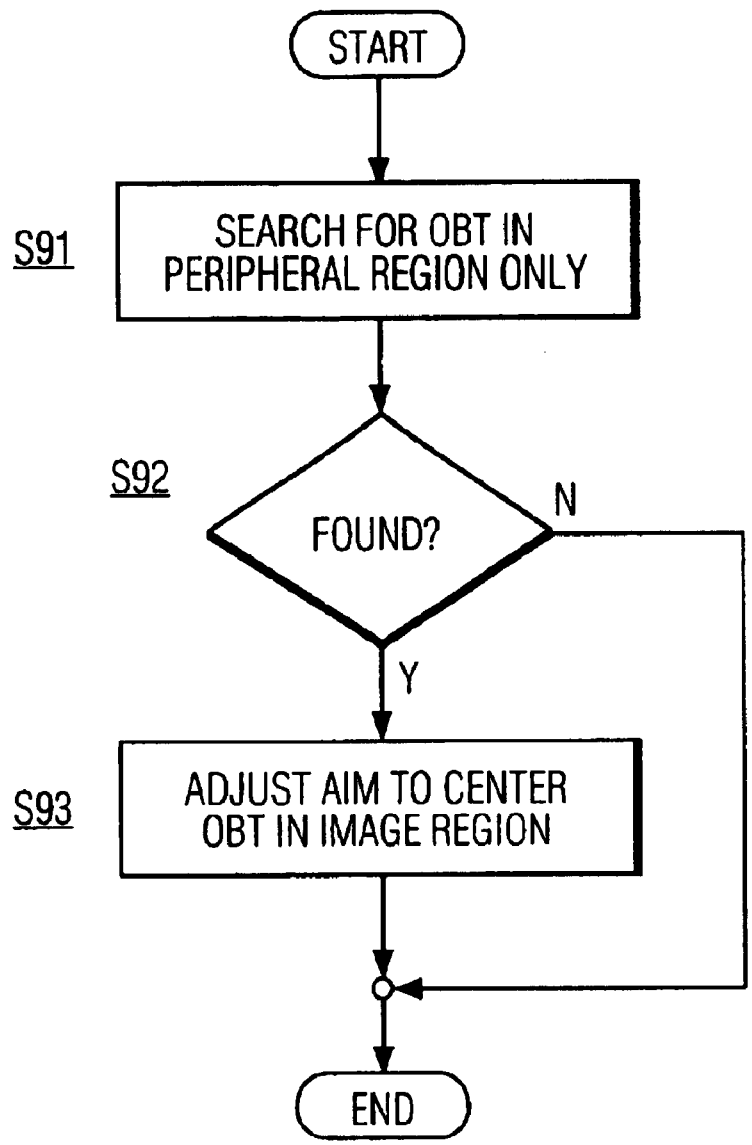
FIG. 8B is a flowchart of a second tracking process.

FIG. 8B is a flow chart of another process usable by the tracking system 15 to track the OBT. In this process, the tracking system 15 tracks the OBT using output signals 13B corresponding to only the central region 26 of the image sensor 43. First, in step S91, the tracking system 15 searches for the OBT in the peripheral region by examining the data inputted from the peripheral region 27 of the image sensor 43. By searching only in this peripheral region, processing overhead can be significantly reduced, particularly when the OBT is the only thing in the scene that moves, or when the OBT has a unique color, as discussed above. In step S92, a test is performed to determine whether the OBT has been found in the peripheral region. If the OBT has not been found, no further processing is performed in this routine. If, on the other hand, the OBT has been found, processing proceeds to step S93 where the aim of the camera is adjusted in a manner similar to the previously described embodiments.

Figure 9:
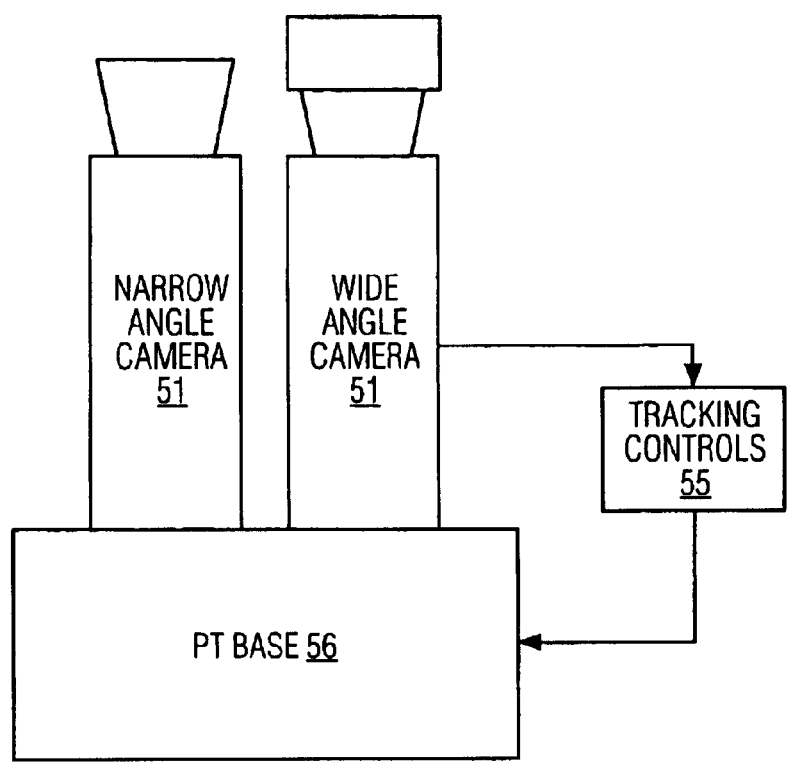
FIG. 9 is a schematic representation of an alternative embodiment that uses a wide-angle camera and a narrow-angle camera mounted on a single pan-and-tilt base.

FIG. 9 shows yet another embodiment that uses two independent cameras 51, 52 mounted on a single PT base 56 so that both cameras 51, 52 are aimed at the same spot. The narrow-angle camera 51 is used to obtain a high quality image of a portion of the scene being imaged, and the wide-angle camera 52 is used to obtain a wide-angle image of the scene. Preferably, both the wide-angle camera 52 and the narrow-angle camera 51 are mounted on the same PT base 56 and aimed in the same direction. As a result, when the PT base aims the narrow-angle camera, the aim of the wide-angle camera will follow along so as to be aimed at the same spot. An output of the wide-angle-camera 52 is provided to the tracking system 55 to implement tracking based on the wide-angle image, using any of a variety of techniques well known to those skilled in the art. Alternatively, the narrow-angle camera and the wide-angle may be mounted on independent bases, and the aiming of the two cameras may be synchronized using any of a variety of techniques well known to those skilled in the art (including, for example, gears, servos, or a pair of independent aiming motors operating under the control of a single controller).

Figure 10A:
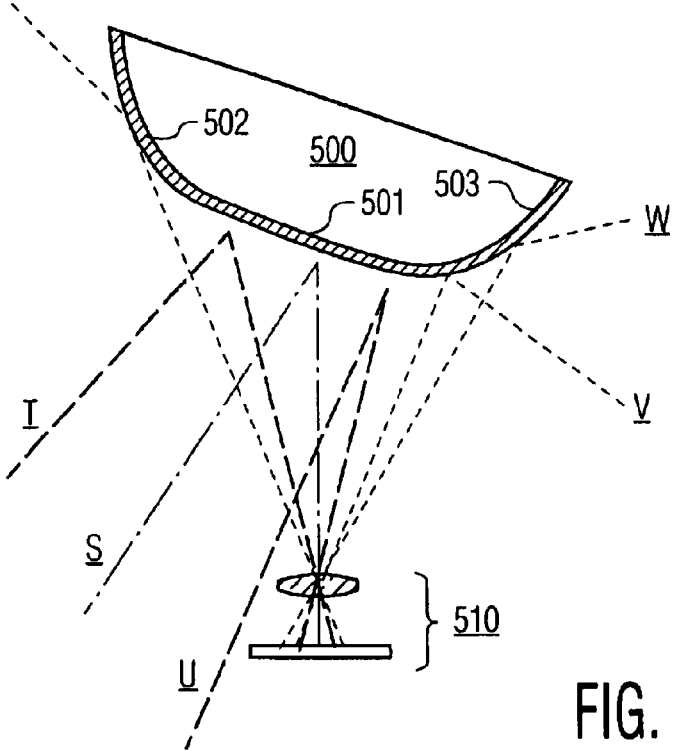
FIG. 10A is a section view of an embodiment that uses a mirror to provide narrow and wide angle views.

FIG. 10A shows another embodiment that uses a camera 510 and a mirror 500 to achieve a similar effect to the embodiments described above. The mirror 500 includes a flat region 501. Light from the scene is reflected by this portion 501, and arrives at the camera 510, resulting in an undistorted narrow-angle view of the scene. The mirror 500 also includes a concave portion 502, 503 which produces in a wide angle image that is picked up by the camera 510. Because the camera 510 is in front of the mirror, 500, an image of the camera itself will appear in scene being imaged. Preferably, the camera 510 is not placed directly in front of the flat portion 501 of the mirror 500 to minimize the size of the image of the camera itself. Optionally, the radius of curvature of the various concave portions 502, 503 of the mirror 500 may be different, as illustrated. Alternatively, although not so depicted, the radius of curvature of the various concave portions 502, 503 may be the same. Optionally, one or more convex bubbles (not shown) may be placed on the mirror so as to produce multiple images of the same scene, so that the reflection of the camera 510 in the mirror 500 will not obstruct the reflection of the OBT. Note that the mirror itself could be pivoted rather than pivoting the entire mirror camera assembly.

Figure 10B:
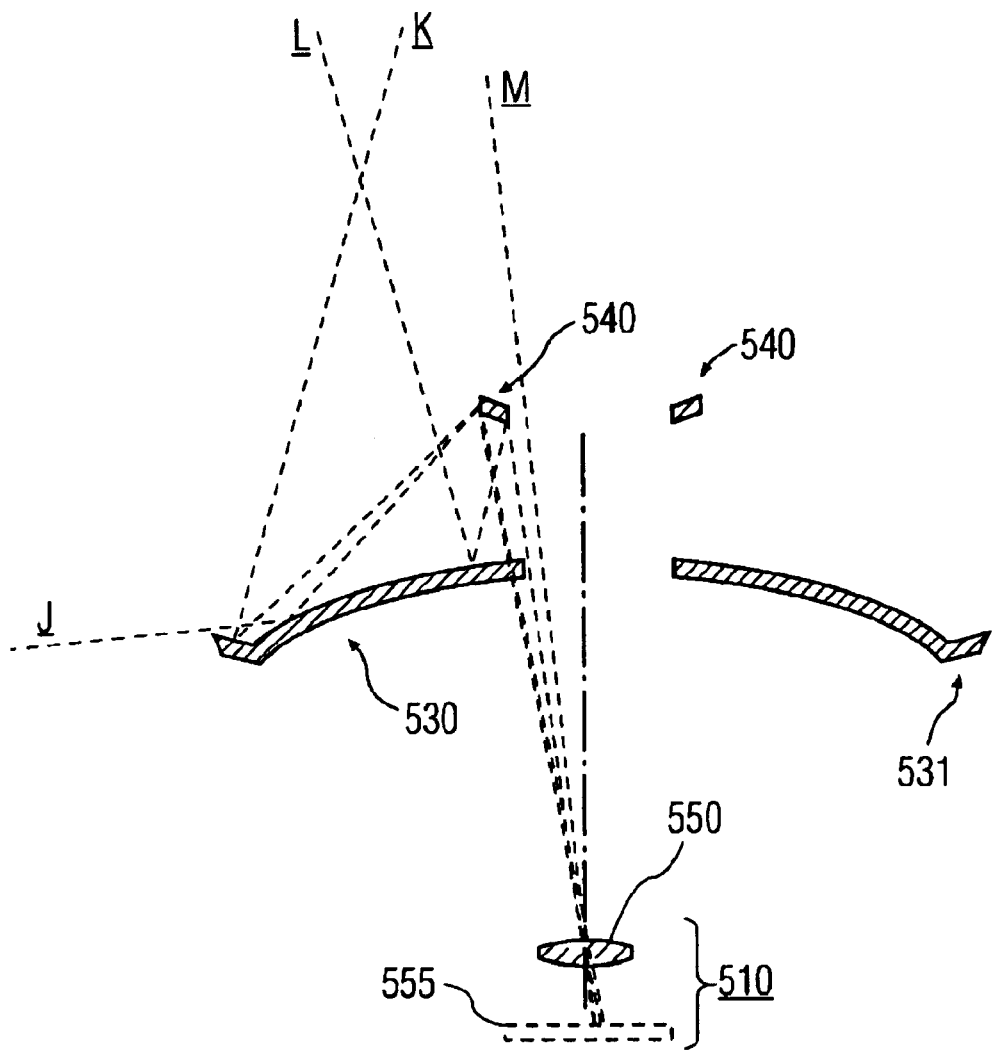
FIG. 10B is a section view of another embodiment that uses mirrors to provide narrow and wide angle views.

FIG. 10B shows another mirror-based embodiment that avoids the problem of the camera appearing in the image. In this embodiment, the camera 510 is placed behind a convex mirror 530 with a hole in its center. Light from subjects that are directly ahead of the camera in a narrow-angle field of view (bounded by ray M) arrives at the camera through the hole in the convex mirror 530. Light from the remainder of the scene being imaged bounces off the front face of the convex mirror 530, onto the ring-shaped reflecting mirror 540, and into the camera 510. The light from the narrow-angle region will be imaged on a central region of the image sensor 555 in the camera 510, and the light from the ring-shaped reflecting mirror 540 will be imaged on a peripheral region of the image sensor 555. Optionally, the convex mirror 530 may include a special reflective surface 531 configured so that portions of the scene located behind the reflecting mirror 540 can be imaged, as shown by ray K. Alternatively, a half-silvered circular mirror (not shown) may be used in place of the torroidal reflecting mirror 540, in which case the special reflective surface 531 on the convex lens 530 will not be necessary.

Figure 11:
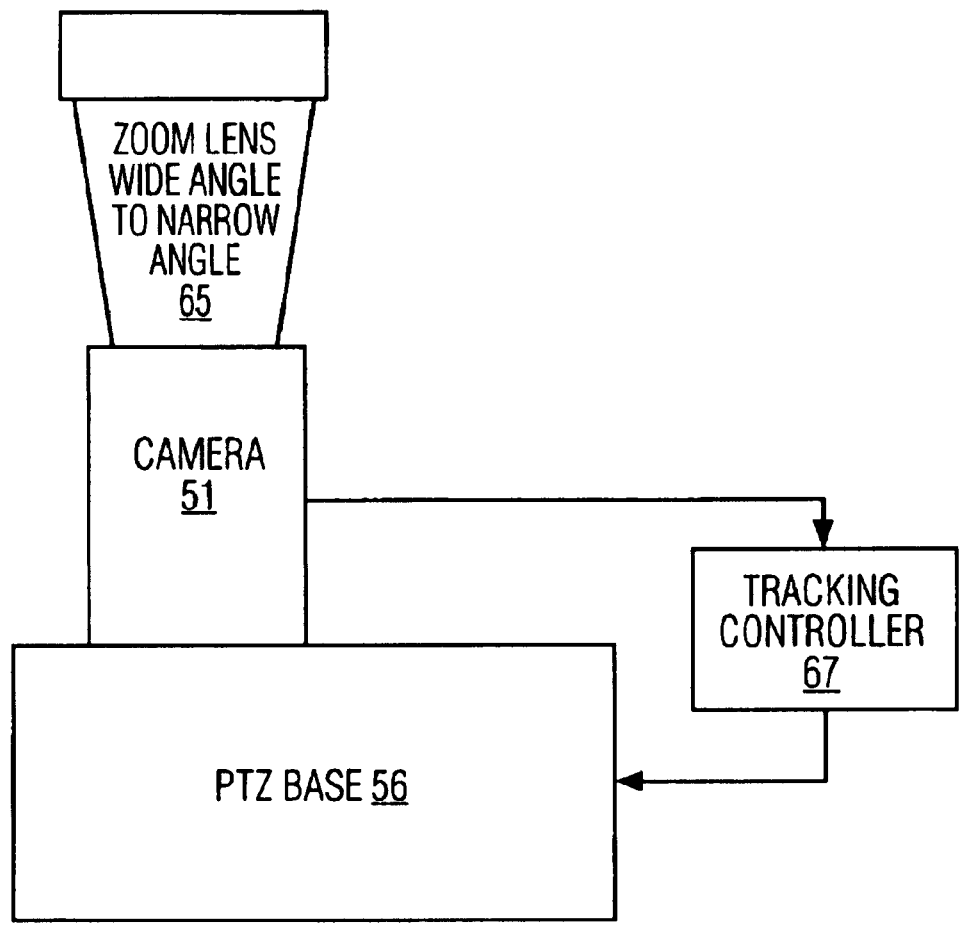
FIG. 11 is an embodiment that uses a zoom lens to produce wide-angle and narrow-angle views.

FIG. 11 shows yet another embodiment that uses a zoom lens 65 on a camera 51 to provide the wide angle and narrow angle images. The camera 51 is mounted on a pan, tilt, and zoom (PTZ) base 56. In this embodiment, the OBT is imaged by the camera 51 when the zoom lens 65 is set to a narrow-angle field of view. Outputs from the image sensor (not shown) of the camera 51 are provided to the tracking controller 67, which generates control signals for the pan-tilt-zoom base 56. As long as a tracking dropout does not occur, tracking is accomplished in a conventional manner while the zoom lens 65 is set to its narrow-angle setting.

Figure 12:
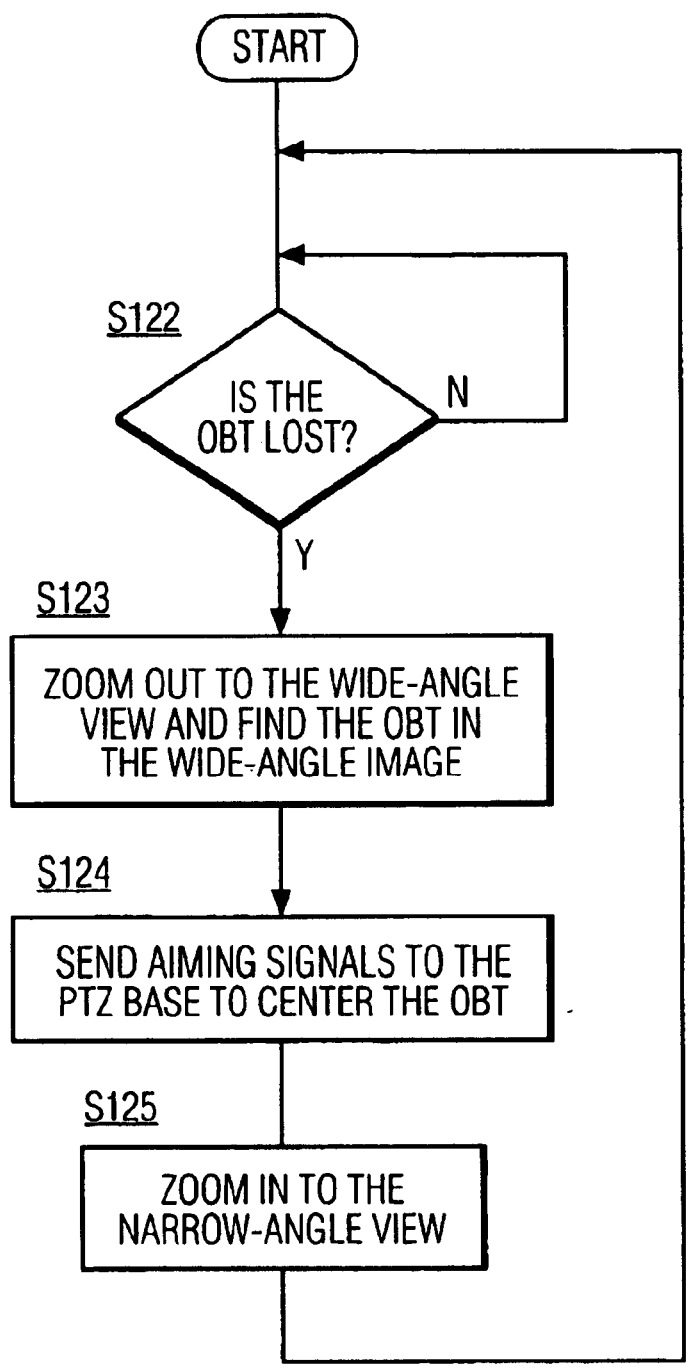
FIG. 12 is a flowchart of a tracking process used with the FIG. 11 embodiment.

FIG. 12 is a flowchart that depicts the operation of the FIG. 11 embodiment. First, in step S122, a test is performed to determine whether the OBT is lost. If the OBT is not lost, no zoom or aim adjustments are required, and processing returns to the start of the routine. If the OBT is lost (i.e., a tracking dropout has occurred), the tracking controller 67 generates control signals in step S123 that cause the PTZ base 56 to zoom the lens 65 on the camera 51 to a wide-angle setting. Once the wide angle setting has been established, the OBT is located in the wide angle image. Then, in step S124, the aim of the camera 51 is readjusted so that the OBT will appear in the center of the wide-angle image. Finally, in step S125, control signals are generated that cause the zoom lens 65 on the camera 51 to return to the narrow-angle view so as to provide a high quality image of the OBT.

While the present invention has been explained in the context of the embodiment described above, it is to be understood that various changes may be made to those embodiments, and various equivalents may be substituted, without departing from the spirit or scope of the invention, as will be apparent to persons skilled in the relevant art.

I claim:

1. A camera, comprising:
   an image sensor having a central region, a peripheral region, and an output; and
   collinear optics effective to produce, when aimed at a point of a scene, a narrow-angle image of the point and a central area surrounding the point on the central region of the image sensor, and a wide-angle image of an area surrounding the central area on the peripheral region of the image sensor,
   wherein the wide-angle image is a non-panoramic image, and wherein the optics includes a lens with a circular central portion and an annular region coinciding, respectively, with the narrow-angle image portion and the wide-angle image portion of the optics.

2. The camera of claim 1, wherein the peripheral region of the image sensor surrounds the central region of the image sensor, and a pixel density of the central region of the image sensor is substantially the same as a pixel density of the peripheral region of the image sensor.

3. An apparatus for optically tracking a subject, the apparatus comprising:
   a camera including an image sensor having a first region, a second region, and an output;
   optics having a central portion structured to produce a narrow-angle view and having a peripheral portion surrounding the central portion structured to produce a wide-angle view, configured so that when the camera is aimed at a point, the central portion of the optics forms an image of the point and a central area surrounding the point on the first region of the image sensor, and the peripheral portion of the optics forms an image of an area surrounding the central area on the second region of the image sensor;
   a movable base upon which the camera is mounted, configured and arranged to aim the camera in response to drive signals applied to at least one input; and
   a tracking system that, based on the output of the image sensor, generates drive signals that are provided to the at least one input of the movable base, wherein, when a desired subject is imaged by the second region of the image sensor, the drive signals generated by the tracking system cause the movable base to aim the camera at the desired subject and wherein the optics includes a lens with a circular central portion and an annular region coinciding, respectively, with the central and peripheral portions of the optics.

4. The apparatus of claim 3, wherein the tracking system processes the output of the image sensor to compensate for image distortion introduced by the peripheral portion of the optics.

5. The apparatus of claim 3, wherein when the desired subject is not imaged at a center of the first region of the image sensor, the drive signals generated by the tracking system cause the movable base to aim the camera at the desired subject.

6. The apparatus of claim 3, wherein the central portion and the peripheral portion of the optics are collinear.

7. The apparatus of claim 3, wherein the second region of the image sensor surrounds the first region of the image sensor, and a pixel density of the first region of the image sensor is substantially the same as a pixel density of the second region of the image sensor.

8. An apparatus for optically tracking a subject, the apparatus comprising:

an image sensor having a first region, a second region, and an output, and a optical system having a first portion with a narrow-angle view and a second portion with a wide-angle view, configured and arranged so that when the optical system is aimed at a subject, (i) the first portion of the optical system forms an image of the subject on the first region of the image sensor, and (ii) the second portion of the optical system forms an image on the second region of the image sensor;

a movable base upon which the optical system is mounted, configured and arranged to aim the optical system in response to drive signals applied to at least one input; and a tracking system that, based on the output of the image sensor, generates drive signals that are provided to the at least one input of the movable base, wherein, when the subject is imaged by the second region of the image sensor, the drive signals generated by the tracking system cause the movable base to aim the optical system at the subject and wherein a pixel density of the first region of the image sensor is substantially the same as a pixel density of the second region of the image sensor.

9. The apparatus of claim 8, wherein the first portion and the second portion of the optical system are collinear.

10. The apparatus of claim 8, wherein the optical system comprises a lens having a first portion with a narrow-angle view and a second portion with a wide-angle view.

11. The apparatus of claim 8, wherein the optical system comprises a mirror having a first portion with a narrow-angle view and a second portion with a wide-angle view.

12. The apparatus of claim 8, wherein the tracking system processes the output of the image sensor to compensate for image distortion introduced by the second portion of the optical system.

13. The apparatus of claim 8, wherein the second region of the image sensor surrounds the first region of the image sensor.

14. The apparatus of claim 8, wherein when the subject is not imaged at a center of the first region of the image sensor, the drive signals generated by the tracking system cause the movable base to aim the optical system at the subject.

15. An apparatus for optically tracking a subject, the apparatus comprising:

a camera with a PTZ base, the camera having a zoom lens and an output, the zoom lens having a first zoom setting with a narrow-angle view and a second zoom setting with a wide-angle view, configured so that an applied zoom signal selects one of the narrow-angle zoom setting and the wide-angle zoom setting, and an applied aiming signal controls an aim of the camera; and, the zoom lens having a circular central portion and a annular region coinciding, respectively, with the narrow-angle zoom setting and the wide-angle zoom setting a tracking system that tracks a subject, based on the camera output, when the zoom lens is set to the narrow-angle view, wherein, if the tracking system loses track of the subject, the tracking system (i) generates a zoom signal to set the zoom lens to the wide-angle view, (ii) locates the position of the subject, based on the camera output, while the zoom lens is set to the wide-angle view, (iii) generates an aiming signal to aim the camera at the located position of the subject, and (iv) generates a zoom signal to return the zoom lens to the narrow-angle view.

16. A camera comprising:

an image sensor having a central region, a peripheral region, and an output; and collinear optics effective to produce, when aimed at a point of a scene, a narrow-angle image of the point and a central area surrounding the point on the central region of the image sensor, and a wide-angle image of an area surrounding the central area on the peripheral region of the image sensor, wherein the field of view of the wide-angle image is at least twice as large as the field of view of the narrow-angle image and wherein the optics includes a lens with a circular central portion and an annular region coinciding, respectively, with the narrow-angle image portion and the wide-angle image portion of the optics.

17. The camera of claim 16, wherein the peripheral region of the image sensor surrounds the central region of the image sensor, and a pixel density of the central region of the image sensor is substantially the same as a pixel density of the peripheral region of the image sensor.

* * * * *